(12) United States Patent
Kinjo

(10) Patent No.: US 12,467,803 B2
(45) Date of Patent: Nov. 11, 2025

(54) FORCE SENSOR WITH BYPASS WIRE

(71) Applicant: Japan Display Inc., Tokyo (JP)

(72) Inventor: Hiroumi Kinjo, Tokyo (JP)

(73) Assignee: Japan Display Inc., Tokyo (JP)

( * ) Notice: Subject to any disclaimer, the term of this patent is extended or adjusted under 35 U.S.C. 154(b) by 343 days.

(21) Appl. No.: 18/094,165

(22) Filed: Jan. 6, 2023

(65) Prior Publication Data

US 2023/0236076 A1  Jul. 27, 2023

(30) Foreign Application Priority Data

Jan. 26, 2022 (JP) .................. 2022-010532

(51) Int. Cl.
*G01L 1/20* (2006.01)

(52) U.S. Cl.
CPC ...................... *G01L 1/20* (2013.01)

(58) Field of Classification Search
CPC ..... G01L 1/2275; G01L 1/2293; G01L 1/205; G01L 1/20; G01L 1/18; G06F 3/0447
See application file for complete search history.

(56) References Cited

U.S. PATENT DOCUMENTS

| | | | | |
|---|---|---|---|---|
| 3,228,240 A * | 1/1966 | Ormond | ................ | G01L 1/2275 |
| | | | | 73/796 |
| 3,759,093 A * | 9/1973 | Farr | ....................... | G01L 1/2275 |
| | | | | 73/862.622 |
| 7,528,337 B2 * | 5/2009 | Tanabe | ................... | H01H 13/78 |
| | | | | 200/511 |
| 8,878,803 B2 * | 11/2014 | Kimura | ................ | G06F 3/0412 |
| | | | | 345/173 |
| 9,500,547 B1 * | 11/2016 | Ueda | ...................... | G01L 1/2293 |
| 9,597,933 B2 * | 3/2017 | Yamaguchi | ....... | H01L 21/02189 |
| 9,939,314 B2 * | 4/2018 | Kaneko | ................ | G01L 5/0052 |
| 11,216,136 B2 * | 1/2022 | Hwang | ................ | G06F 3/0446 |
| 11,378,472 B2 * | 7/2022 | Kim | ........................ | G01L 1/225 |
| 11,415,826 B2 * | 8/2022 | Takada | ................ | G02F 1/13685 |
| 11,656,134 B2 * | 5/2023 | Kinjo | ..................... | H10D 48/50 |
| | | | | 73/862.632 |
| 11,875,001 B2 * | 1/2024 | Lee | ......................... | G06F 3/044 |
| 12,039,927 B2 * | 7/2024 | Hamer | ................. | G09G 3/3233 |
| 2013/0018489 A1 * | 1/2013 | Grunthaner | ........ | H03K 17/9625 |
| | | | | 324/686 |
| 2013/0021285 A1 * | 1/2013 | Kimura | ................. | G06F 3/0447 |
| | | | | 345/173 |
| 2013/0021544 A1 * | 1/2013 | Fukuyama | .......... | G02F 1/13338 |
| | | | | 200/600 |
| 2014/0300251 A1 * | 10/2014 | Colli | .................... | G06F 3/03547 |
| | | | | 29/25.35 |
| 2017/0220162 A1 * | 8/2017 | Ko | .......................... | G06F 3/045 |
| 2017/0350772 A1 * | 12/2017 | DeGanello | ................ | G01L 1/20 |

FOREIGN PATENT DOCUMENTS

JP  2018-146489 A  9/2018

* cited by examiner

Primary Examiner — Tran M. Tran
(74) Attorney, Agent, or Firm — K&L Gates LLP

(57) ABSTRACT

A force sensor includes an array substrate having a first surface provided with a plurality of array electrodes, a node provided on the array substrate and supplied with constant potential, a sensor layer facing the first surface, and a plurality of bypass wires provided on the array substrate and coupling the respective array electrodes to the node. The resistance value of each bypass wire is larger than the resistance value of the sensor layer.

13 Claims, 14 Drawing Sheets

FORCE SENSOR WITH BYPASS WIRE

CROSS-REFERENCE TO RELATED APPLICATION

This application claims the benefit of priority from Japanese Patent Application No. 2022-010532 filed on Jan. 26, 2022, the entire contents of which are incorporated herein by reference.

BACKGROUND

1. Technical Field

The present disclosure relates to a force sensor.

2. Description of the Related Art

A force sensor of Japanese Patent Application Laid-open Publication No. 2018-146489 includes an array substrate provided with a plurality of array electrodes, a sensor layer facing the array electrode, and a counter electrode disposed opposite the array electrode with the sensor layer interposed therebetween. A surface of the force sensor on a side where the sensor layer is disposed when viewed from the array substrate is a detection region in which force is detected. When force is applied to the detection region, the counter electrode and the sensor layer deform toward the array substrate, and the sensor layer contacts the array electrode. Accordingly, current flows from the counter electrode to the array electrode through the sensor layer. The sensor layer contains conductive particles dispersed inside insulating resin. As the resin deforms, the conductive particles contact one another and the resistance value of the sensor layer decreases. As the resin largely deforms, the number of conductive particles contacting one another increases and the resistance value of the sensor layer largely decreases. Accordingly, as force input to the force sensor increases, the value of current flowing to the array electrode increases as well. When no load is applied to the force sensor, the sensor layer does not contact the array electrode, and the array electrode and the counter electrode are not electrically coupled. In other words, circuits for detecting the value of current input to the array electrode are opened.

Baseline correction for the sensor element is widely known that a detected value (force value) is measured with reference to the value of output from the sensor element when no impulsion is applied (no load is applied). With such correction, it is possible to reduce influence of external noise. However, in the above-described force sensor, circuits are opened and closed at measurement. As a result, the output value largely varies and the circuit constant, which is a time constant, varies as well. Thus, it is difficult to perform the baseline correction, and measurement accuracy potentially degrades.

The present disclosure is intended to provide a force sensor in which circuits are closed when no load is applied.

SUMMARY

A force sensor according to a first embodiment of the present disclosure includes an array substrate having a first surface provided with a plurality of array electrodes, a node provided on the array substrate and supplied with constant potential, a sensor layer facing the first surface, and a plurality of bypass wires provided on the array substrate and coupling the respective array electrodes to the node. The resistance value of each bypass wire is larger than the resistance value of the sensor layer.

A force sensor according to a second embodiment of the present disclosure includes an array substrate having a first surface, a common electrode provided on the first surface, and a sensor layer facing the first surface. The array substrate includes a plurality of array electrodes provided on the first surface, a plurality of common electrodes provided on the first surface, a plurality of first gate lines, a plurality of second gate lines, a plurality of drive transistors that have gate electrodes coupled to the respective first gate lines and drive the respective array electrodes, and a plurality of bypass transistors that have gate electrodes coupled to the respective second gate lines, have drain electrodes coupled to the respective array electrodes, and have source electrodes coupled to the common electrode, and the resistance value of each bypass transistor is larger than the resistance value of the sensor layer.

DETAILED DESCRIPTION

Aspects (embodiments) of a force sensor of the present disclosure will be described below in detail with reference to the accompanying drawings. Contents described below in the embodiments do not limit the disclosure. Constituent components described below include those that could be easily thought of by the skilled person in the art and those identical in effect. Constituent components described below may be combined as appropriate. What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the disclosure. In the present specification and the drawings, any constituent component same as that already described with reference to an already described drawing is denoted by the same reference sign, and detailed description thereof is omitted as appropriate in some cases.

In the present specification and the claims, an expression with "on" in description of an aspect in which one structural body is disposed on another structural body includes both a case in which the one structural body is directly disposed on the other structural body in contact and a case in which the one structural body is disposed above the other structural body with still another structural body interposed therebetween, unless otherwise stated in particular.

First Embodiment

Figure 1:
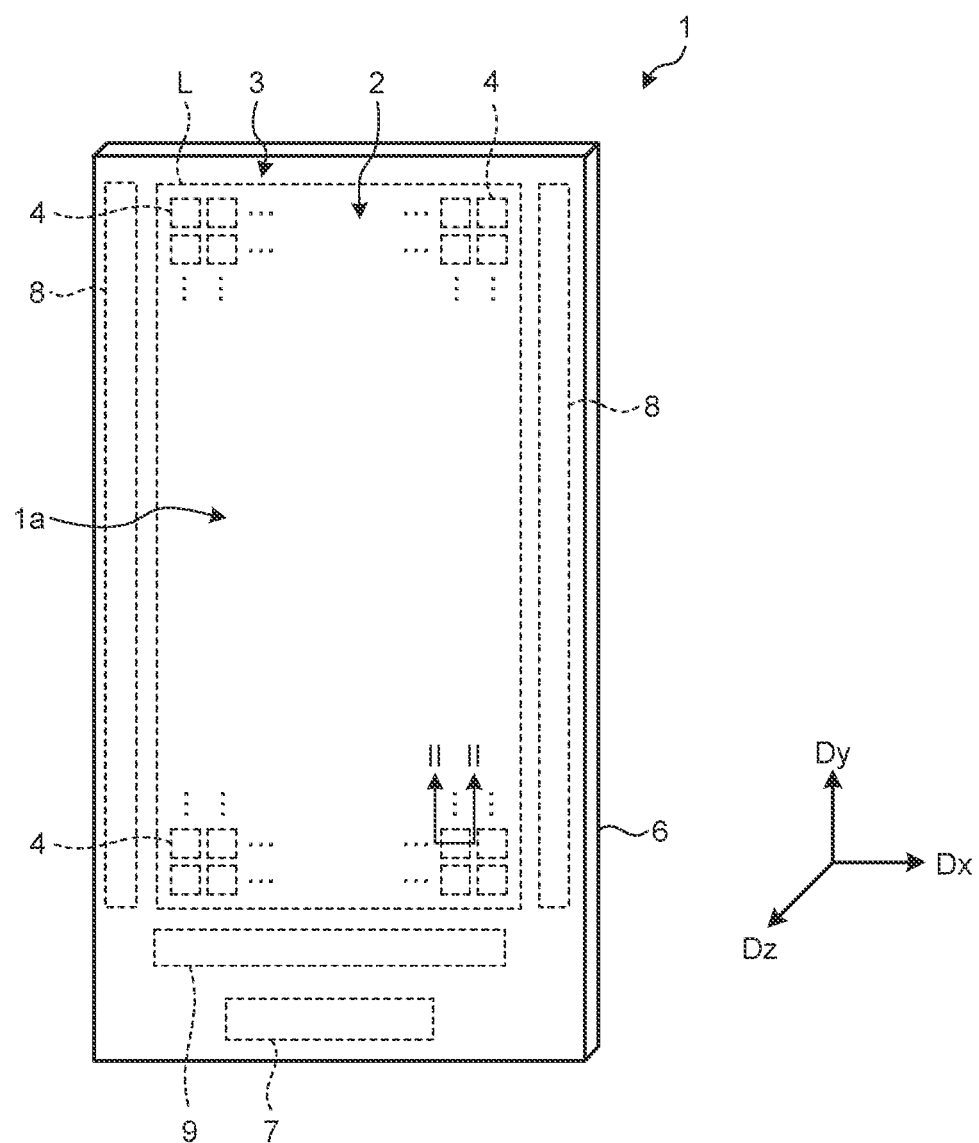
FIG. 1 is a perspective view illustrating a sectional structure of a force sensor according to a first embodiment.

FIG. 1 is a perspective view schematically illustrating a force sensor according to a first embodiment. As illustrated in FIG. 1, this force sensor 1 has a detection surface 1a on which force is detected, and has a flat plate shape. The force sensor 1 has a rectangular shape when viewed in the normal direction of the detection surface 1a. When viewed from the normal direction of the detection surface 1a, the detection surface 1a of the force sensor 1 is divided into a detection region 2 in which force can be detected and a peripheral region 3 surrounding the outside of the detection region. In FIG. 1, a boundary line L is illustrated to facilitate recognition of the detection region 2 and the peripheral region 3. The detection region 2 is divided into a plurality of individual detection regions 4. In other words, the detection region 2 is a set of the individual detection regions 4.

The individual detection regions 4 are arrayed in a first direction Dx and a second direction Dy. The first direction Dx is parallel to the detection surface 1a. The second direction Dy is parallel to the detection surface 1a and intersects the first direction Dx. In the present embodiment, the first direction Dx is parallel to a short side of the force sensor 1. The second direction Dy is parallel to a long side of the force sensor 1. Accordingly, the first direction Dx and the second direction Dy are orthogonal to each other. The normal direction of the detection surface 1a is orthogonal to the first direction Dx and the second direction Dy and referred to as a third direction Dz in some cases.

Figure 2:
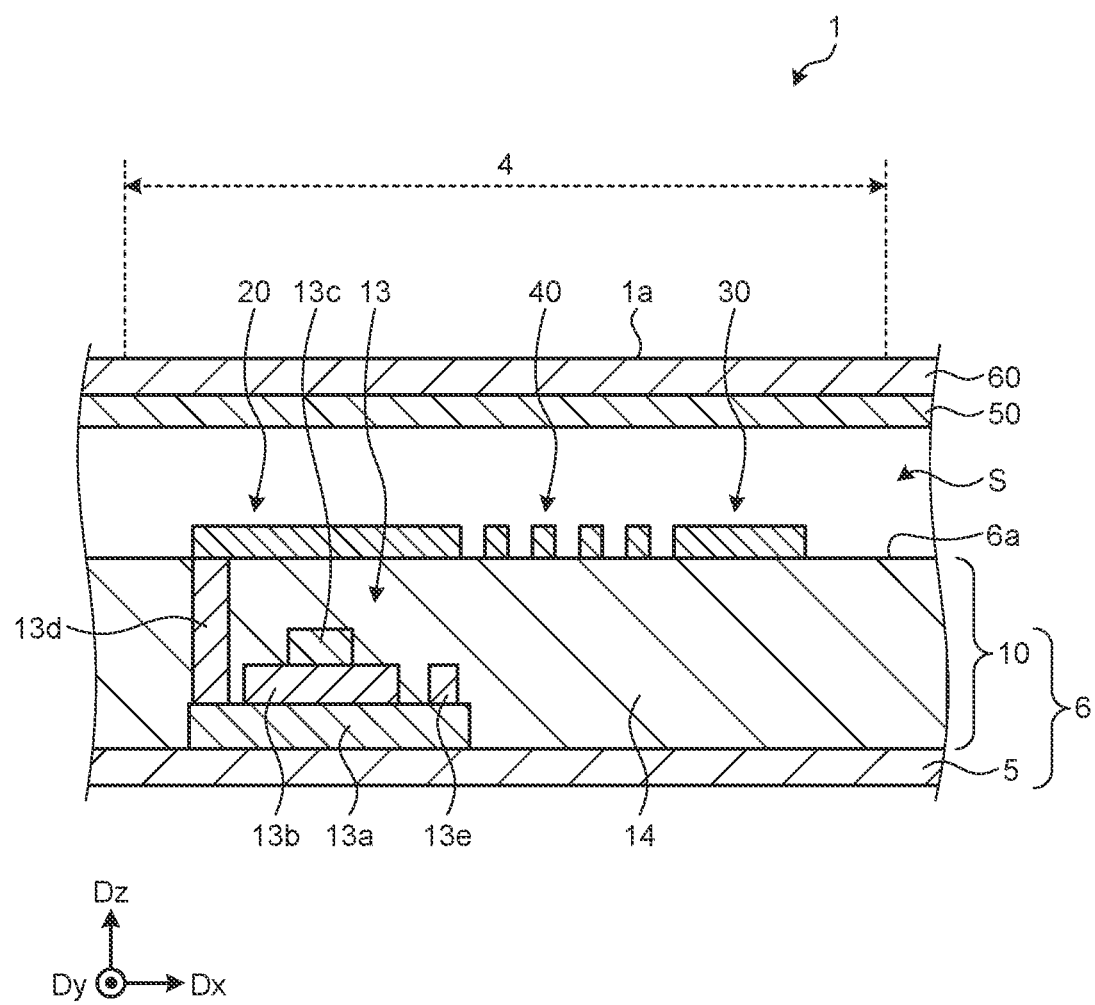
FIG. 2 is a sectional view taken along line II-II in FIG. 1 when viewed in the direction of arrows.

FIG. 2 is a sectional view taken along line II-II in FIG. 1 when viewed in the direction of arrows. As illustrated in FIG. 2, the force sensor 1 includes a substrate 5, an array layer 10, an array electrode 20, a common electrode 30, a bypass wire 40, a sensor layer 50, and a protective layer 60.

The substrate 5 is an insulating substrate. The substrate 5 is, for example, a glass substrate, a resin substrate, or a resin film. In the following description, an upper side is one side in the third direction Dz and means a side on which the array layer 10 is disposed when viewed from the substrate 5.

The array layer 10 includes a drive transistor 13 in each individual detection region. The array layer 10 also includes various components for driving the drive transistor 13. Specifically, as illustrated in FIG. 1, the array layer 10 includes a coupling part 7, gate line drive circuits 8, a signal line selection circuit 9, gate lines 11 (refer to FIG. 3), and signal lines 12 (refer to FIG. 3). The array layer 10 is integrated with the substrate 5 to form an array substrate 6.

The coupling part 7, the gate line drive circuits 8, and the signal line selection circuit 9 are disposed in the peripheral region 3 in the array layer 10. The coupling part 7 is used to couple with a drive integrated circuit (IC) disposed outside the force sensor 1. The drive IC may be mounted as a chip-on film (COF) on a flexible printed board or a rigid substrate coupled with the coupling part 7. Alternatively, the drive IC may be mounted as a chip-on glass (COG) in the peripheral region 3 of the substrate 5.

The gate line drive circuits 8 are circuits configured to drive the gate lines 11 (refer to FIG. 3) based on various kinds of control signals from the drive IC. The gate line drive circuits 8 sequentially or simultaneously selects a plurality of gate lines 11 and supplies a gate drive signal to the selected gate lines 11. The signal line selection circuit 9 is a switch circuit configured to sequentially or simultaneously select a plurality of signal lines 12 (refer to FIG. 3). The signal line selection circuit 9 is, for example, a multiplexer. The signal line selection circuit 9 couples the selected signal lines 12 to the drive IC based on a selection signal supplied from the drive IC.

Figure 3:
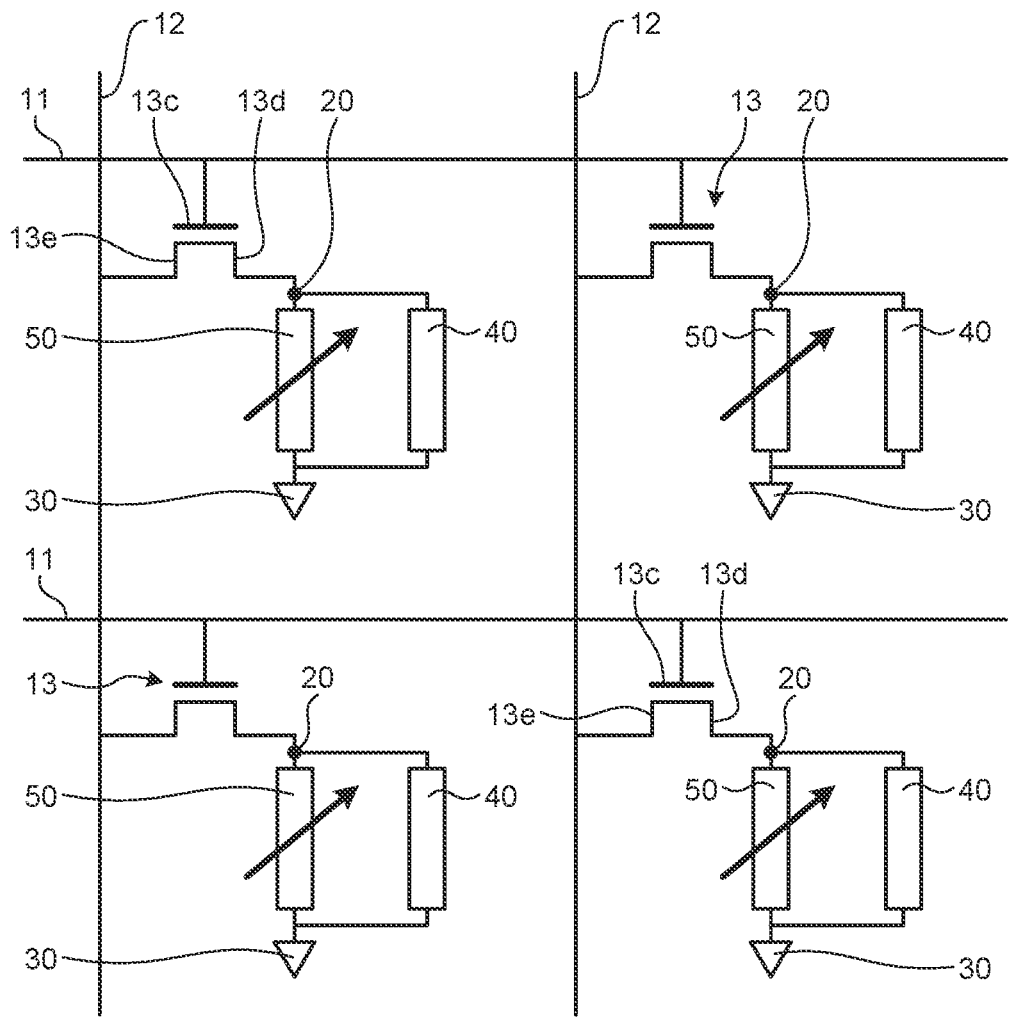
FIG. 3 is a circuit diagram illustrating a circuit configuration of the force sensor of the first embodiment.

FIG. 3 is a circuit diagram illustrating a circuit configuration of the force sensor of the first embodiment. As illustrated in FIG. 3, the gate lines 11 extend in the first direction Dx. The gate lines 11 are arrayed in the second direction Dy. The signal lines 12 extend in the second direction Dy. The signal lines 12 are arrayed in the first direction Dx. In addition, although not particularly illustrated, the array layer 10 includes a common wire extending along the peripheral region 3. The common wire is coupled to the drive IC through the coupling part 7 and supplied with a constant amount of current from the drive IC.

One drive transistor 13 is provided in each individual detection region 4. As illustrated in FIG. 2, each drive transistor 13 includes a semiconductor layer 13a, a gate insulating film 13b, a gate electrode 13c, a drain electrode 13d, and a source electrode 13e. The source electrode 13e is electrically coupled to an array electrode 20. The gate electrode 13c is coupled to a gate line 11. The drain electrode 13d is coupled to a signal line 12. Accordingly, when the gate line 11 is scanned, the electric state of the array electrode 20, in other words, an electric signal (the value of current) input to the array electrode 20 is obtained through the signal line 12. Accordingly, force applied in the individual detection region 4 is detected.

In the array substrate 6, a first surface 6a facing the sensor layer 50 is flattened by an insulating layer 14 covering the drive transistors 13 and the like.

The array electrodes 20, the common electrode 30, and the bypass wires 40 are provided on the first surface 6a of the array substrate 6. The array electrodes 20, the common electrode 30, and the bypass wires 40 are made of a metallic material such as indium tin oxide (ITO). In the present disclosure, the array electrodes 20, the common electrode 30, and the bypass wires 40 may be made of metallic materials different from one another and are not particularly limited.

The common electrode 30 is coupled to the common wire (not illustrated) through a non-illustrated wire buried in the insulating layer 14 of the array layer 10. Accordingly, the common electrode 30 is supplied with a constant amount of current from the drive IC.

Figure 4:
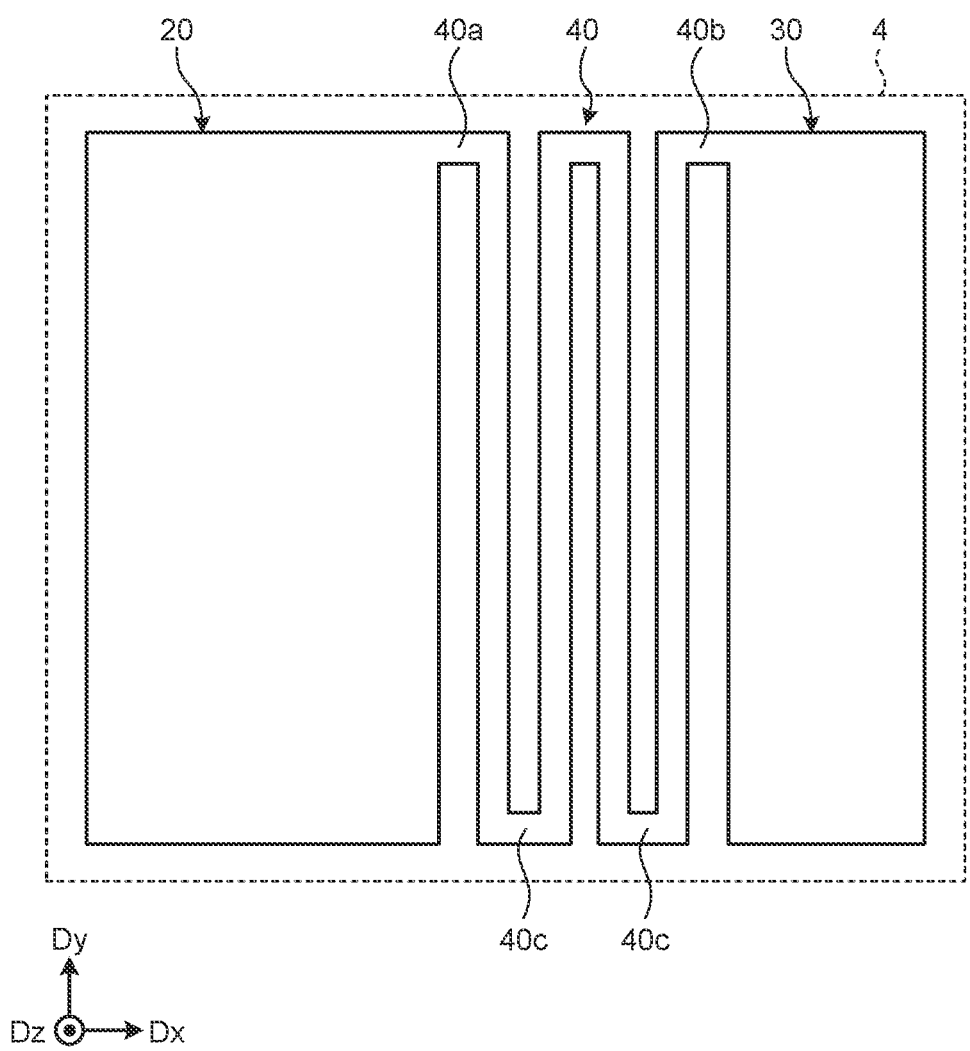
FIG. 4 is a plan view of an array electrode, a common electrode, and a bypass wire in FIG. 2 when viewed from a sensor layer.

FIG. 4 is a plan view of the array electrode, the common electrode, and the bypass wire in FIG. 2 when viewed from the sensor layer. As illustrated in FIG. 4, the array electrode 20 and the common electrode 30 have rectangular shapes in a plan view. The array electrode 20 and the common electrode 30 are separated from each other in the first direction Dx. The bypass wire 40 is disposed between the array electrode 20 and the common electrode 30. One end 40a of the bypass wire 40 is coupled to the array electrode 20. Another end 40b of the bypass wire 40 is coupled to the common electrode 30. Accordingly, the array electrode 20 and the common electrode 30 are coupled to each other through the bypass wire 40. In the present embodiment, the common electrode 30 corresponds to a node coupled to the bypass wire 40.

As illustrated in FIG. 4, a plurality of curved parts 40c having a U shape in a plan view, extending in the second direction Dy orthogonal to the first direction Dx in which the array electrode 20 and the common electrode 30 are separated from each other, and returning from end parts are provided at a middle part of the bypass wire 40. In other words, the bypass wire 40 has an elongated shape meandering between the array electrode 20 and the common electrode 30. Accordingly, the bypass wire 40 has a higher resistance value than in a case of a straight shape connecting the array electrode 20 and the common electrode 30 over the shortest distance. With the curved parts 40c, the resistance value of the bypass wire 40 of the present embodiment is larger than the resistance value of the sensor layer 50 at detection of the smallest force value that can be detected by the force sensor 1.

The sensor layer 50 is a made of a material containing conductive fine particles inside a highly insulating resin layer. The fine particles are dispersed inside the resin layer and separated from one another. Accordingly, the resistance value of the sensor layer 50 is high when the resin layer is not deformed. When the resin layer is deformed, the fine particles contact or approach one another and the resistance value of the sensor layer 50 decreases. As the deformation amount of the resin layer increases, the number of contacting fine particles increases and the resistance value of the sensor layer 50 largely decreases. The sensor layer 50 is also called a pressure-sensitive layer.

As illustrated in FIG. 2, the sensor layer 50 is supported by a spacer (not illustrated) provided on the array substrate 6 and is disposed on the upper side of the array substrate 6. The sensor layer 50 faces each of the array electrode 20, the common electrode 30, and the bypass wire 40 in the third direction Dz. The sensor layer 50 is provided with a space S on the lower side and separated from each of the array electrode 20, the common electrode 30, and the bypass wire 40. The spacer (not illustrated) may be provided in the peripheral region 3 on the first surface 6a of the array substrate 6 or provided between the individual detection regions 4 and is not particularly limited in the present disclosure.

The protective layer 60 is an insulating layer disposed on the upper side of the sensor layer 50 and extending along the sensor layer 50. The protective layer 60 is integrated with the sensor layer 50 by a non-illustrated bonding layer. The upper surface of the protective layer 60 is the detection surface 1a.

Figure 5:
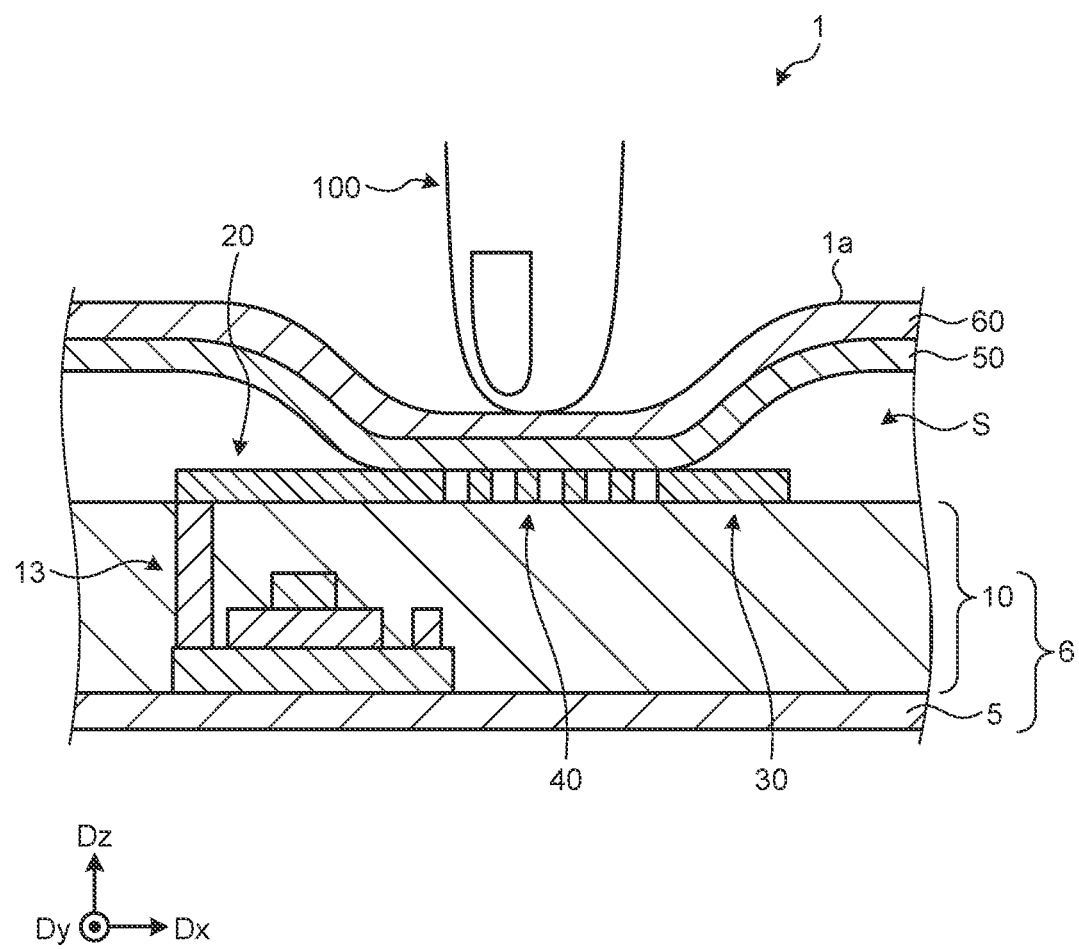
FIG. 5 is a diagram illustrating a state in which a detection surface of the force sensor of the first embodiment is pressed by a finger.

FIG. 5 is a diagram illustrating a state in which the detection surface of the force sensor of the first embodiment is pressed by a finger. As illustrated in FIG. 5, part of the protective layer 60 and the sensor layer 50 is deformed in a recessed shape toward the array substrate 6 when the detection surface 1a is pressed by a finger 100. Accordingly, the sensor layer 50 contacts the array electrode 20 and the common electrode 30. The resistance value of the sensor layer 50 decreases through deformation by pressing. Accordingly, the sensor layer 50 electrically couples the array electrode 20 and the common electrode 30. As a result, current flows from the common electrode 30 to the array electrode 20, and force application to the detection surface 1a can be detected.

The deformation amount of the sensor layer 50 increases as force by the finger 100 increases. Simultaneously, the decrease amount of the resistance value of the sensor layer 50 increases. In addition, as force by the finger 100 increases, the area of a contact region in which the sensor layer 50 contacts the array electrode 20 and the common electrode 30 increases and the amount of current flowing to the array electrode 20 increases. Thus, the magnitude of force applied to the detection surface 1a can be detected by measuring the value of current input to the array electrode 20.

The following describes circuit configurations of the individual detection regions 4 on the array substrate 6. As illustrated in FIG. 3, each array electrode 20 is electrically coupled to the common electrode 30 through the corresponding bypass wire 40. With this configuration, when the gate drive signal is input to a gate line 11 and a signal line 12 is selected in a case in which no load is input to the force sensor 1, the value of current input to the corresponding array electrode 20 through the corresponding bypass wire 40 is output to the signal line 12.

In a case in which a load is input to the force sensor 1, the sensor layer 50 contacts the array electrode 20 and the common electrode 30. In other words, the sensor layer 50 and the bypass wire 40 are coupled in parallel between the array electrode 20 and the common electrode 30. When the resistance value of the bypass wire 40 is smaller than the resistance value of the sensor layer 50, current does not flow through the sensor layer 50 and the magnitude of force cannot be measured. However, in the present embodiment, the resistance value of the bypass wire 40 is larger than the resistance value of the sensor layer 50. Specifically, the resistance value of the bypass wire 40 is larger than the resistance value of the sensor layer 50 when the value of an electric signal input to the array electrode 20 through the sensor layer 50 is minimum. With this configuration, current supplied from the common electrode 30 does not pass through the bypass wire 40 but always flows through the sensor layer 50. Then, the value of current input to the array electrode 20 through the sensor layer 50 is output to the signal line 12.

As described above, circuits in the force sensor 1 of the first embodiment are closed even in a state in which no load is applied. Accordingly, response to external noise is constant and baseline correction can be easily performed.

The force sensor 1 of the first embodiment is described above, but the force sensor of the present disclosure is not limited to examples in the first embodiment. For example, the resistance value of each bypass wire 40 only needs to be larger than the resistance value of the sensor layer 50 when the value of an electric signal input to the corresponding array electrode 20 through the sensor layer 50 is minimum, and the method of increasing (adjusting) the resistance value of the bypass wire 40 is not particularly limited. For example, the material of the bypass wire 40 may be changed to a material having a larger resistance value. In a case in which such a material having a larger resistance value is used, the bypass wire 40 may be straight without meandering as in the embodiment. In a case in which the bypass wire 40 is meandered, at least part of the bypass wire 40 may be meandered instead of meandering the entire bypass wire 40. Although each bypass wire 40 of the first embodiment is disposed on the first surface 6a, the present disclosure is not limited thereto. The following describes a first modification and a second modification in which each bypass wire is not disposed on the first surface 6a.

First Modification

Figure 6:
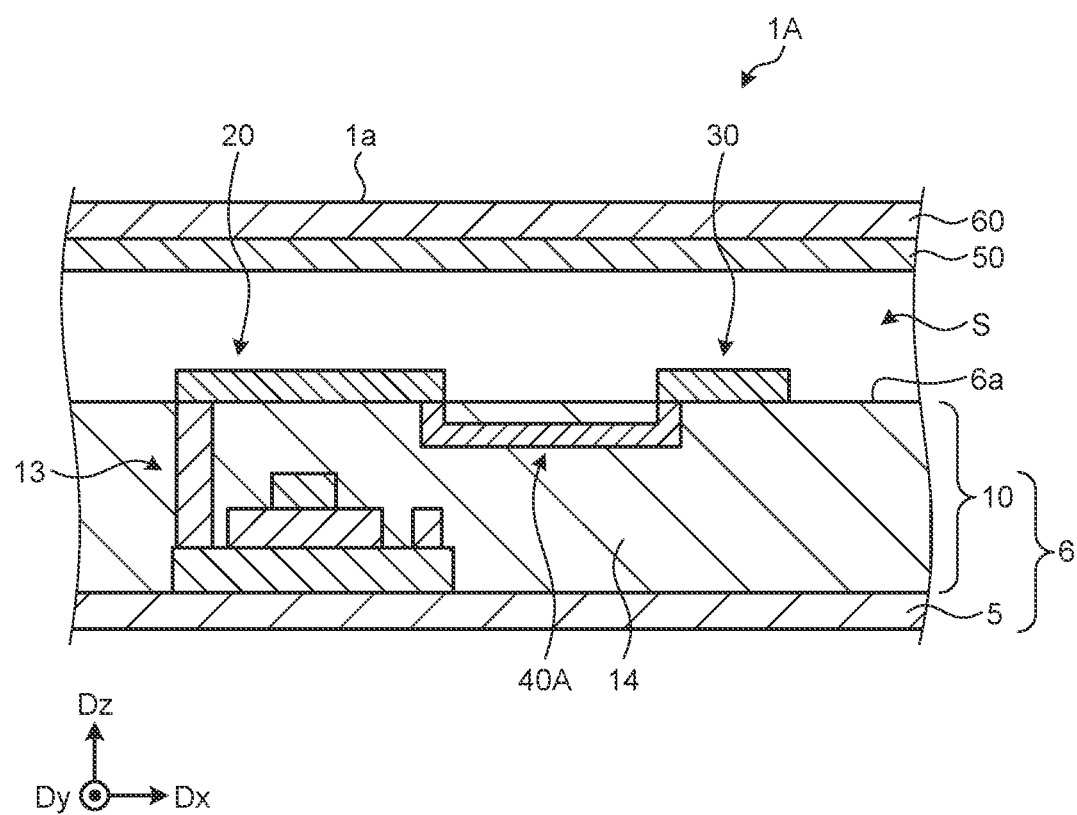
FIG. 6 is a sectional view illustrating a section of a force sensor of a first modification.

FIG. 6 is a sectional view illustrating a section of a force sensor of the first modification. As illustrated in FIG. 6, each bypass wire 40A of a force sensor 1A of the first modification is buried in the insulating layer 14. In other words, the bypass wire 40A is positioned inside the insulating layer 14 and not disposed on the first surface 6a of the array substrate 6. With this configuration, the bypass wire 40A does not contact the sensor layer 50 when the detection surface 1a is pressed and the sensor layer 50 moves toward the first surface. Thus, it is possible to avoid the bypass wire 40A from being pressed and broken by the sensor layer 50. Moreover, since the bypass wire 40A of the first modification extends in the third direction Dz as well, the resistance value thereof is increased. Although the bypass wire 40A is entirely buried inside the insulating layer 14 in the first modification, at least part of the bypass wire 40A may be buried inside the insulating layer 14 in the present disclosure.

Second Modification

Figure 7:
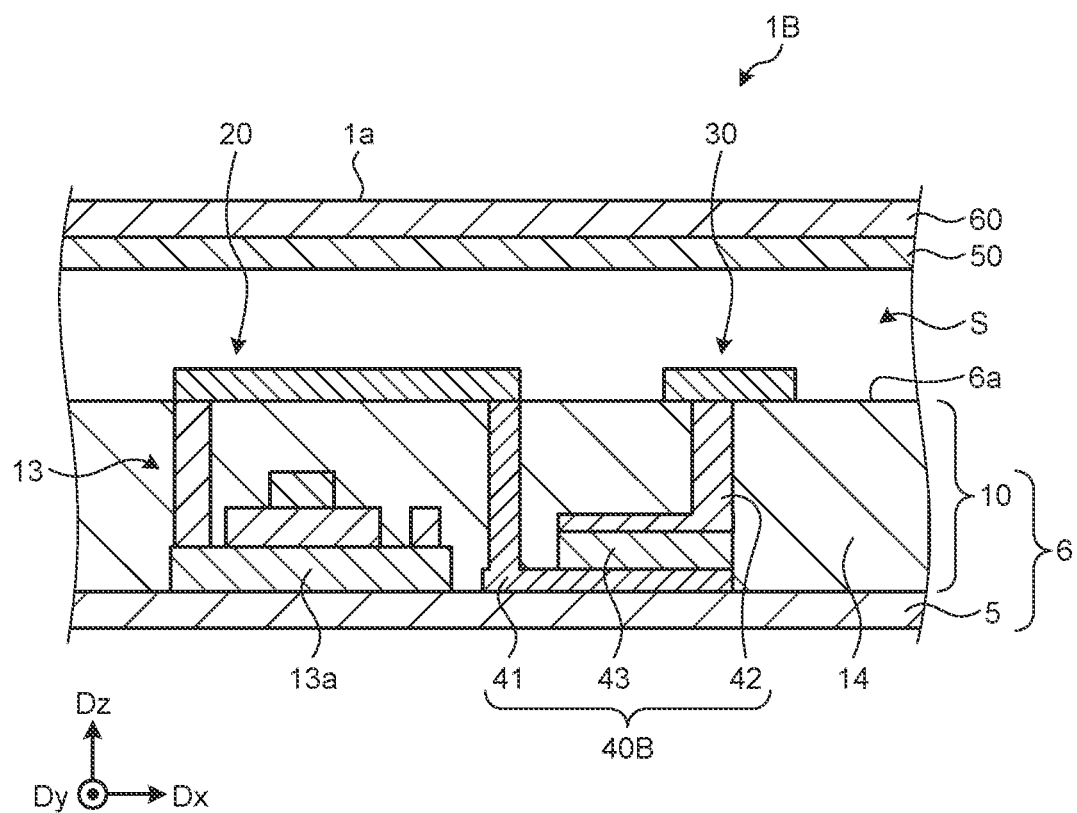
FIG. 7 is a sectional view illustrating a section of a force sensor of a second modification.

FIG. 7 is a sectional view illustrating a section of a force sensor of the second modification. As illustrated in FIG. 7, each bypass wire 40B of a force sensor 1B of the second modification includes a first bypass wire 41 containing a metallic material and coupled to the corresponding array electrode 20, a second bypass wire 42 containing a metallic material and coupled to the common electrode 30, and a bypass semiconductor layer 43 coupled to each of the first bypass wire 41 and the second bypass wire 42. The bypass semiconductor layer 43 is made of the same material as the semiconductor layer 13a of each drive transistor 13. Thus, the bypass semiconductor layer 43 is generated simultaneously with the semiconductor layer 13a of the drive transistor 13. Accordingly, manufacturing of the bypass semiconductor layer 43 is easy. In this manner, according to the second modification, the bypass semiconductor layer 43 is included in the bypass wire 40B. With this configuration, the resistance value of the bypass wire 40B can be increased as compared to a case in which the bypass wire 40B is entirely made of a metallic material.

Second Embodiment

Figure 8:
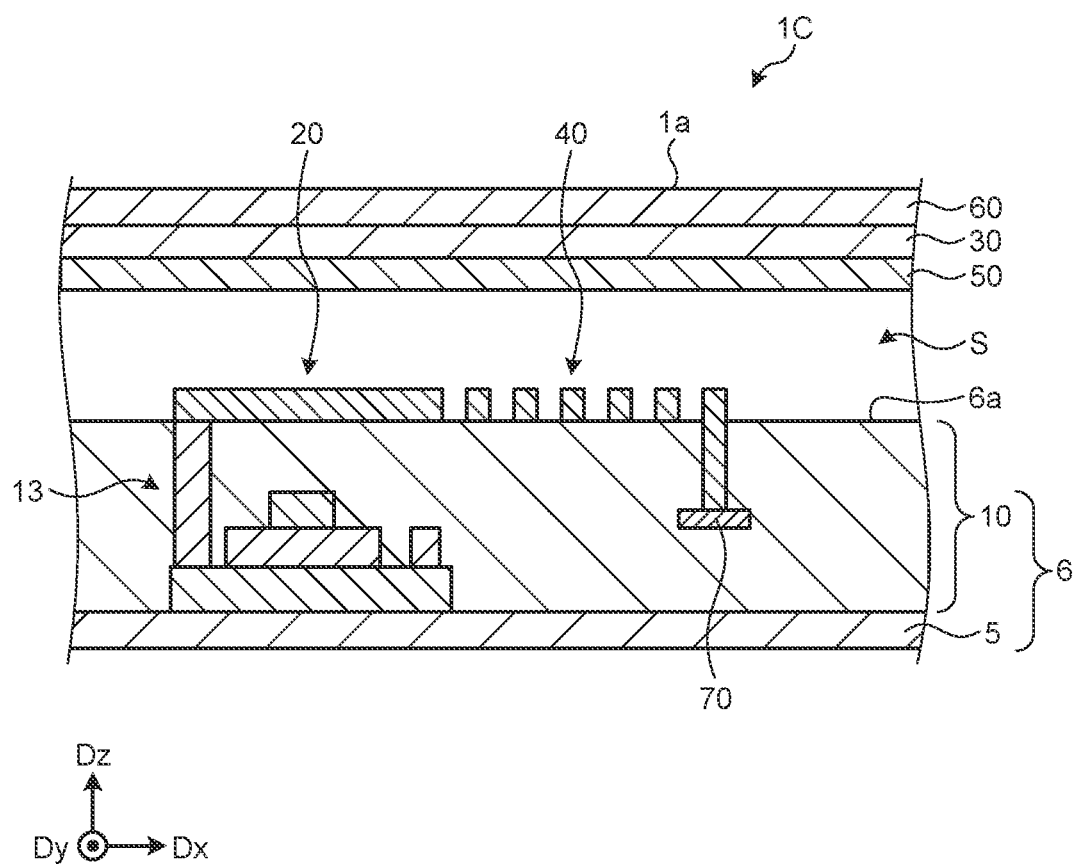
FIG. 8 is a sectional view illustrating a section of a force sensor of a second embodiment.
Figure 9:
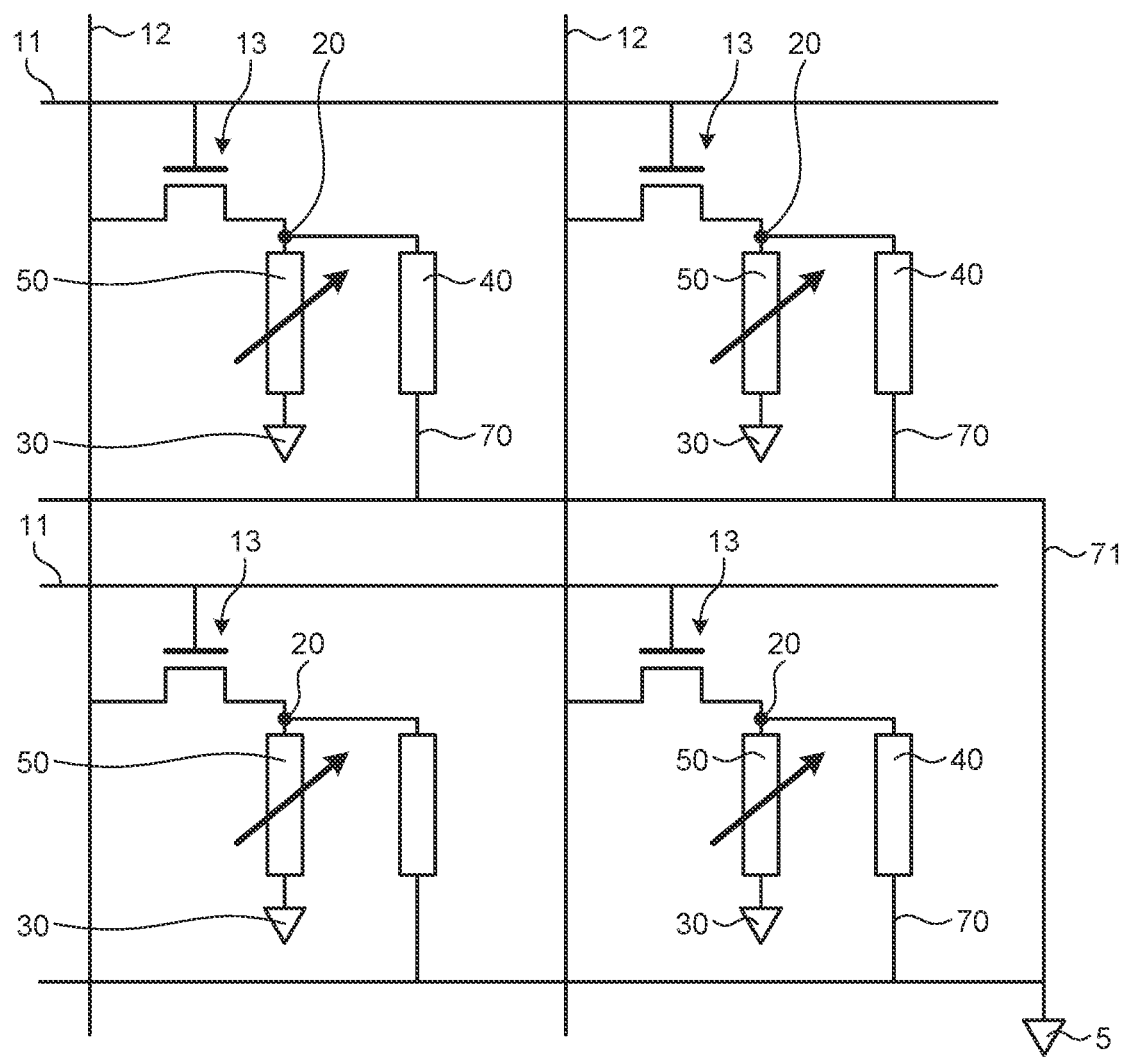
FIG. 9 is a circuit diagram illustrating a circuit configuration of the force sensor of the second embodiment.

FIG. 8 is a sectional view illustrating a section of a force sensor of a second embodiment. FIG. 9 is a circuit diagram illustrating a circuit configuration of the force sensor of the second embodiment. This force sensor 1C of the second embodiment is different from the force sensor 1 of the first embodiment in that the common electrode 30 is a counter electrode disposed between the sensor layer 50 and the protective layer 60 and facing the array electrodes 20 in the third direction Dz. Moreover, the force sensor 1C of the second embodiment is different from the first embodiment in that a ground electrode 70 is provided in the array substrate 6.

The ground electrode 70 is positioned on the lower side of the first surface 6a and buried in the insulating layer 14. Accordingly, the ground electrode 70 does not contact the sensor layer 50. The ground electrode 70 is coupled to the corresponding array electrode 20 through a bypass wire 40C. As illustrated in FIG. 9, the ground electrode 70 is coupled to a ground wire 71. In the present embodiment, the ground electrode 70 corresponds to a node to which the bypass wire 40 is coupled. The ground wire 71 extends from the electrode to the coupling part 7. The ground electrode 70 is supplied with ground current from the drive IC.

As described above, circuits are closed in the force sensor of the second embodiment even when no load is applied. Accordingly, the same effects as in the first embodiment can be obtained. In the present disclosure, the bypass wires of each above-described modification may be applied to the force sensor of the second embodiment.

Third Embodiment

Figure 10:
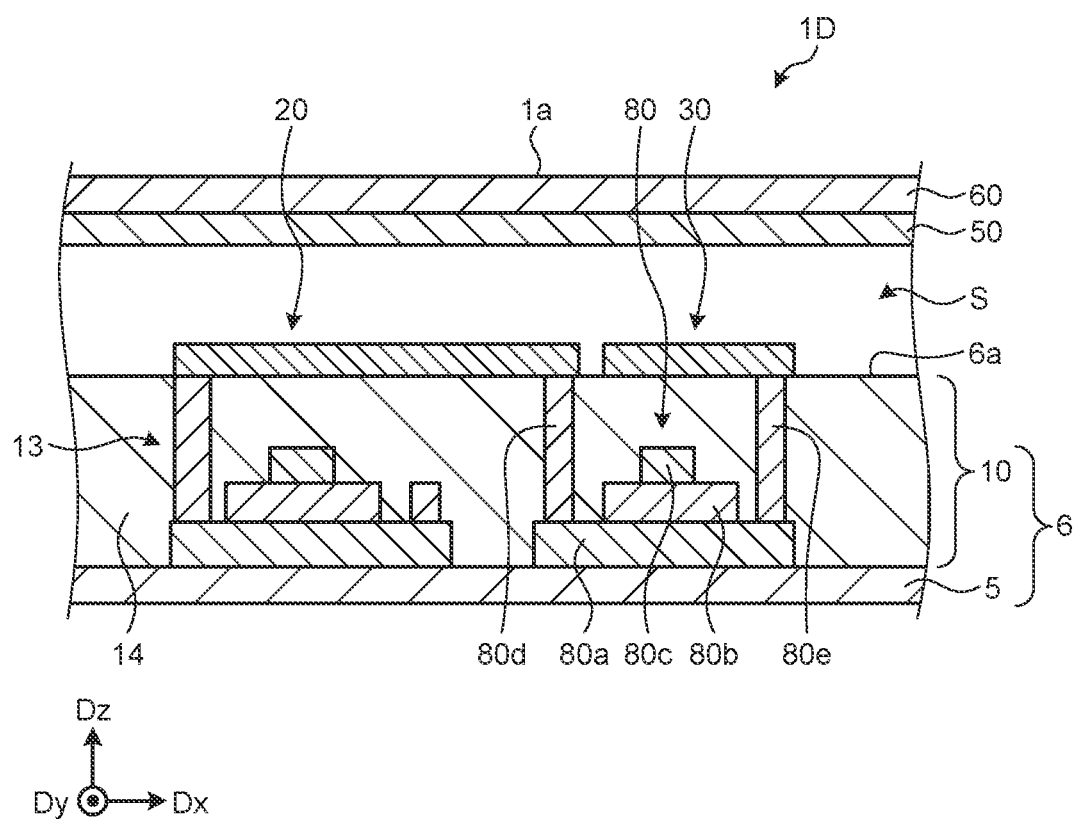
FIG. 10 is a sectional view illustrating a section of a force sensor of a third embodiment.
Figure 11:
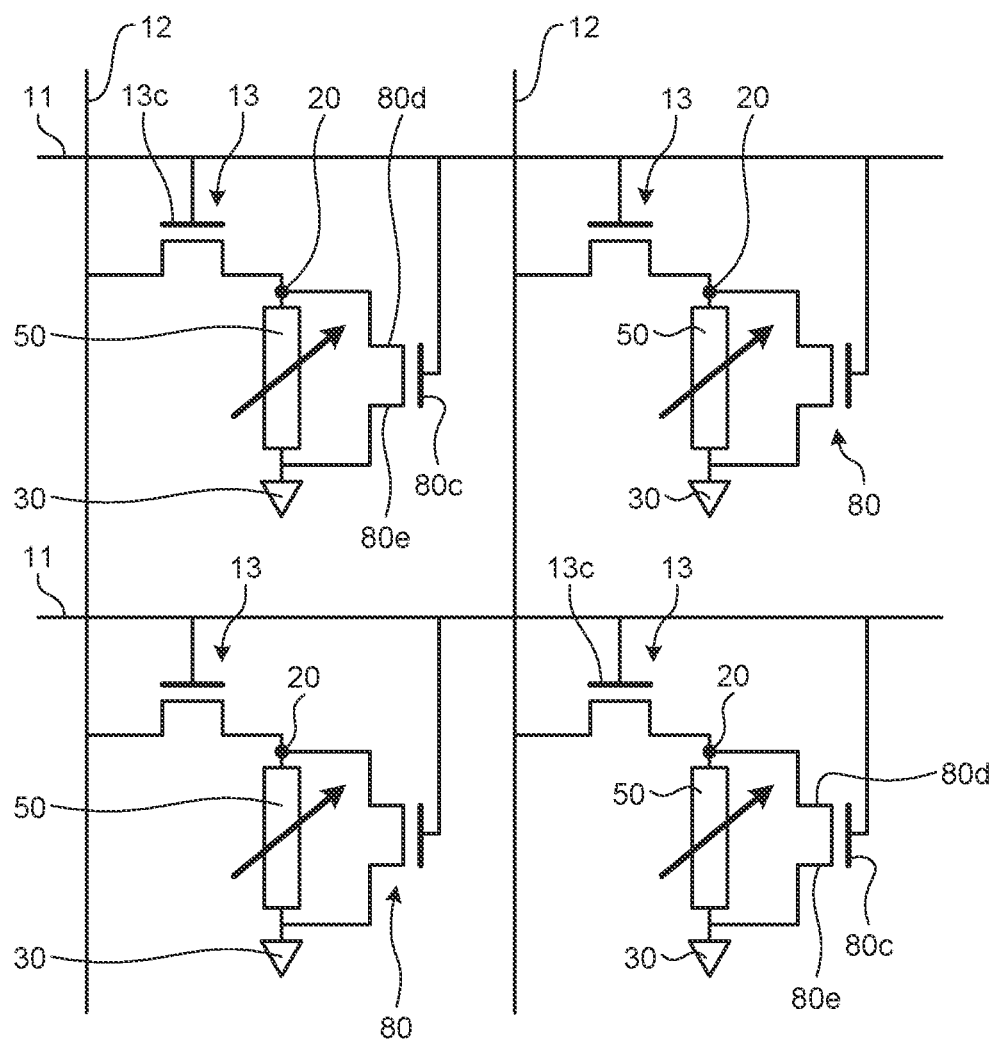
FIG. 11 is a circuit diagram illustrating a circuit configuration of the force sensor of the third embodiment.

FIG. 10 is a sectional view illustrating a section of a force sensor of a third embodiment. FIG. 11 is a circuit diagram illustrating a circuit configuration of the force sensor of the third embodiment. A force sensor 1D of the third embodiment is different from the force sensor of the first embodiment in that the force sensor 1D includes bypass transistors 80 in place of bypass wires. Each bypass transistor 80 includes a semiconductor layer 80a, a gate insulating film 80b, a gate electrode 80c, a drain electrode 80d, and a source electrode 80e. The drain electrode 80d is coupled to the corresponding array electrode 20. The source electrode is coupled to the common electrode 30. As illustrated in FIG. 11, the gate electrode 80c is coupled to the corresponding gate line 11.

According to the third embodiment, when a drive signal is input to the gate electrode 13c of the drive transistor 13 through the gate line 11, the drive signal is input to the gate electrode 80c of the bypass transistor 80 as well. Accordingly, the common electrode 30 is coupled to the array electrode 20 through the bypass transistor 80. When no force is input to the detection surface 1a, current supplied from the common electrode 30 flows to the array electrode 20. When force is input to the detection surface 1a, current supplied from the common electrode 30 flows through the sensor layer 50 having a resistance value smaller than that of the bypass transistor 80. In this manner, according to the third embodiment, circuits are closed even when no load is applied. Accordingly, the same effects as in the first embodiment can be obtained.

Although the embodiments are described above, the sensor layer of the present disclosure is not limited to those described above. The following describes other forms of the sensor layer.

Third Modification

Figure 12:
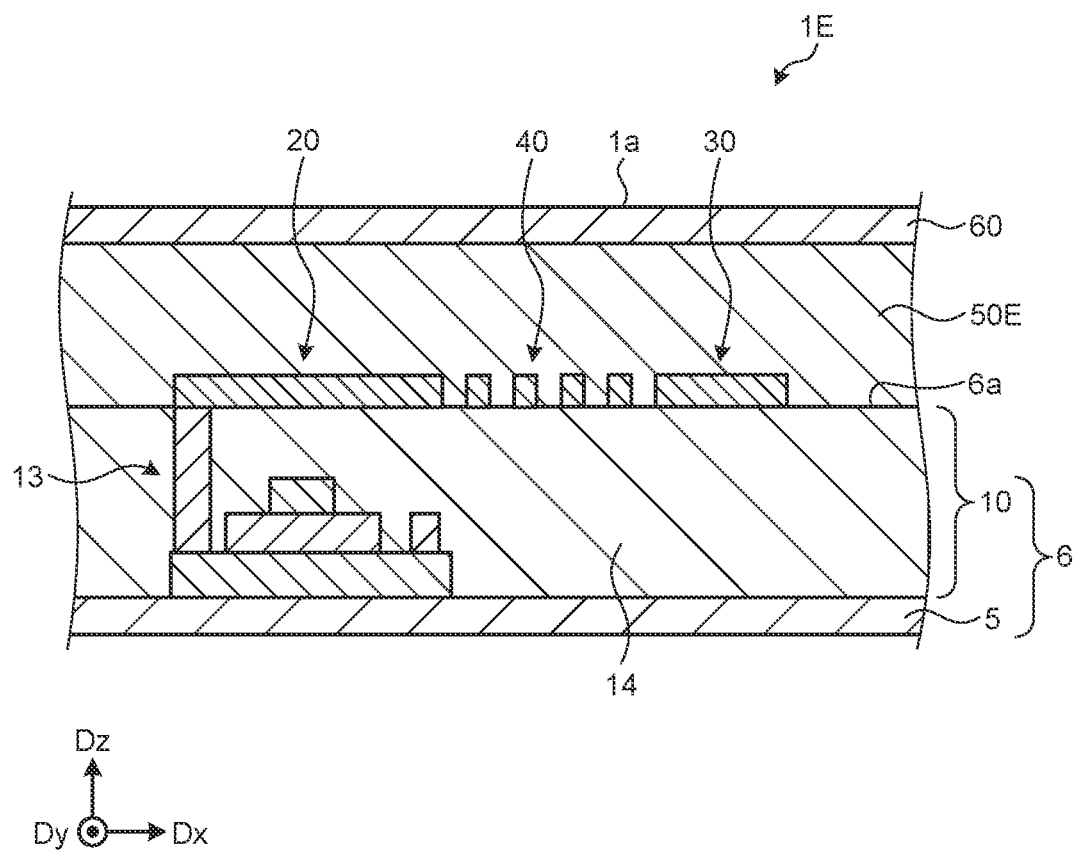
FIG. 12 is a sectional view illustrating a section of a force sensor of a third modification.

FIG. 12 is a sectional view illustrating a section of a force sensor of a third modification. A sensor layer 50E of a force sensor 1E of the third modification is provided between the first surface 6a of the array substrate 6 and the protective layer 60. The sensor layer 50E contacts the array electrode 20, the common electrode 30, and the bypass wire 40 even when deformation is not present. The sensor layer 50E contains conductive fine particles inside insulating resin as described above in the first embodiment. The sensor layer 50 provides insulation when no force is applied, in other words, when no deformation is present. When forced is applied and deformation occurs, the resistance value of sensor layer 50E decreases and the common electrode 30 and the array electrode 20 are electrically coupled to each other. As the force increases, the deformation amount of the sensor layer 50E increases and the amount of current flowing to the array electrode 20 increases. However, the area of a contact region in which the sensor layer 50E contacts the common electrode 30 and the array electrode 20 does not change as the force increases. In other words, the sensor layer 50E does not have such a function that the amount of current flowing to the array electrode 20 changes as the area of the contact region changes, which is a difference from the sensor layer 50 of the first embodiment.

Fourth Modification

Figure 13:
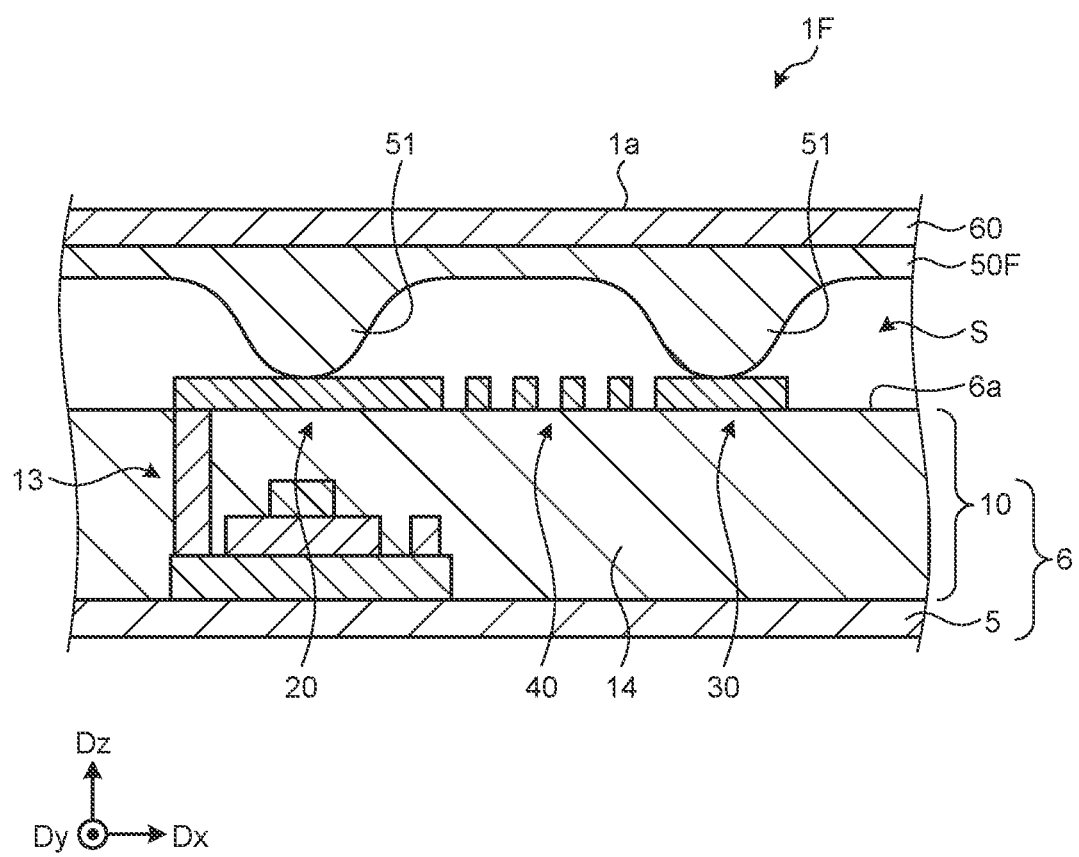
FIG. 13 is a sectional view illustrating a section of a force sensor of a fourth modification.
Figure 14:
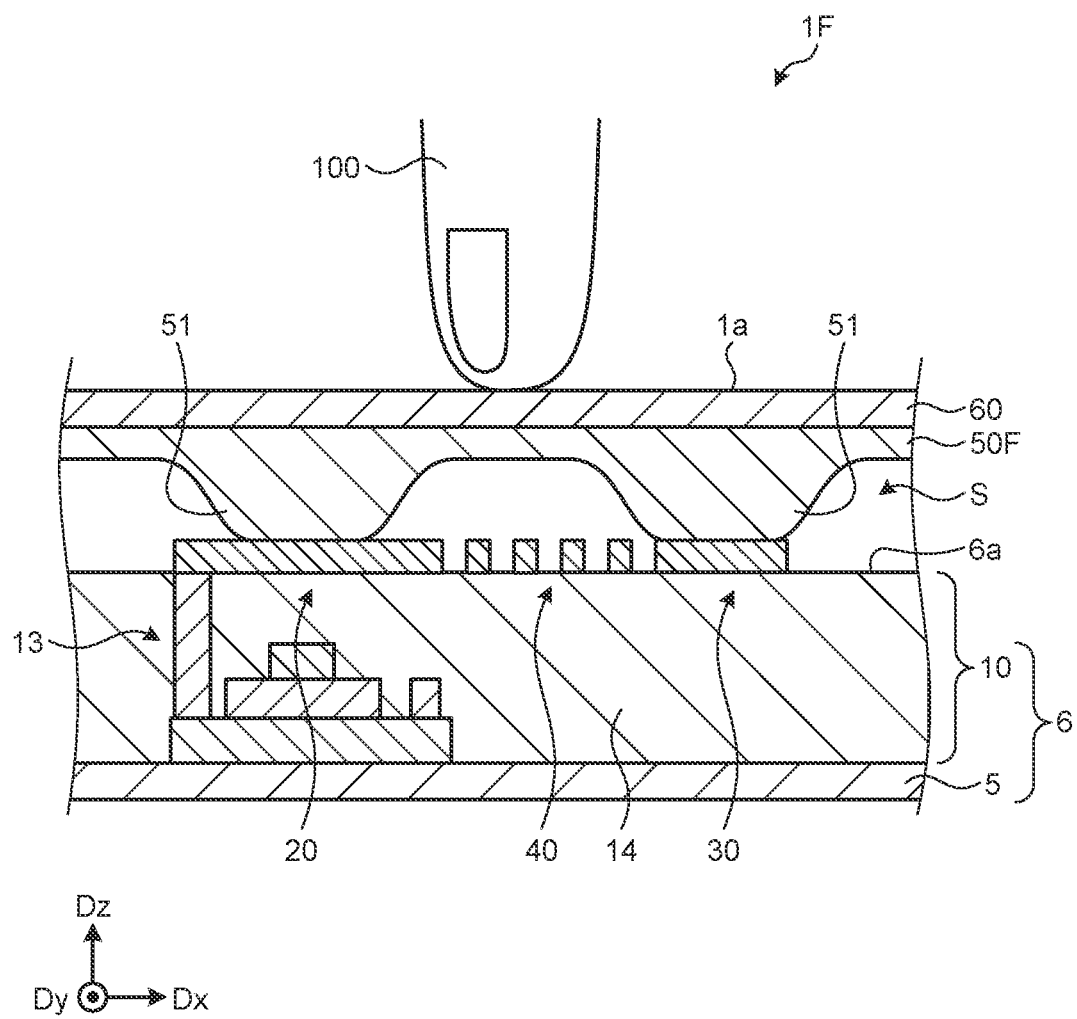
FIG. 14 is a sectional view of the force sensor of the fourth modification when force is input.

FIG. 13 is a sectional view illustrating a section of a force sensor of a fourth modification. FIG. 14 is a sectional view of the force sensor of the fourth modification when force is input. A sensor layer 50F of this force sensor 1F of the fourth modification includes two convex portions 51 protruding toward the array electrode 20 and the common electrode 30. A distal end part of each convex portion 51 contacts the array electrode 20 or the common electrode 30. The sensor layer 50F is made of ITO or a semiconductor material and made of a highly insulating material. In the state illustrated in FIG. 13, the distal end part of each convex portion 51 has a small area of contact with the array electrode 20 or the common electrode 30. Accordingly, the sensor layer 50F does not electrically couple the array electrode 20 and the common electrode 30.

However, when the detection surface 1a is pressed as illustrated in FIG. 14, the sensor layer 50F deforms in the third direction Dz and the area of contact between each convex portion 51 and the array electrode 20 or the common electrode 30 increases. Accordingly, the sensor layer 50F electrically couples the array electrode 20 and the common electrode 30 and current flows to the array electrode 20. As force applied to the sensor layer 50F increases, the area of contact between each convex portion 51 and the array electrode 20 or the common electrode 30 increases, and accordingly, the amount of current flowing through the sensor layer 50F increases. Specifically, the amount of current input to the array electrode 20 increases in proportion to increase in the area of contact of the sensor layer 50F. Thus, the magnitude of force input to the detection surface 1a can be detected.

The sensor layer 50F of the fourth modification is described above as an exemplary sensor layer having a resistance value that changes as the area of contact changes, but the force sensor of the present disclosure may include a sensor layer shaped and disposed differently from the sensor layer 50F and is not limited to a particular sensor layer. Moreover, the sensor layer 50F of the fourth modification is entirely made of the same material, but a separated body part may be formed of an insulation material such as resin, and a sensor layer made of the same material as the sensor layer 50F may be provided on the surface of the body part. In such an example as well, the area of contact of the sensor layer covering the body part changes as the detection surface 1a is pressed, and accordingly, the magnitude of force can be detected.

What is claimed is:

1. A force sensor having a plurality of detection regions, comprising:
an array substrate having a first surface;
a sensor layer facing the first surface, wherein
each of the detection regions includes:
an array electrode on the first surface;
a node provided on the first surface and supplied with constant potential; and
a bypass wire provided on the first surface and coupling the array electrode to the node,
the resistance value of the bypass wire is larger than the resistance value of the sensor layer, when the value of an electric signal input to the array electrode through the sensor layer is minimum.

2. The force sensor according to claim 1, wherein the node is a common electrode.

3. The force sensor according to claim 1, wherein the node is a ground electrode buried in the array substrate.

4. The force sensor according to claim 1, wherein at least part of the bypass wire meanders on the first surface.

5. The force sensor according to claim 2, wherein at least part of the bypass wire meanders on the first surface.

6. The force sensor according to claim 3, wherein at least part of the bypass wire meanders on the first surface.

7. The force sensor according to claim 1, wherein at least part of the bypass wire is buried inside the array substrate beyond the first surface.

8. The force sensor according to claim 2, wherein at least part of the bypass wire is buried inside the array substrate beyond the first surface.

9. The force sensor according to claim 3, wherein at least part of the bypass wire is buried inside the array substrate beyond the first surface.

10. The force sensor according to claim 1, wherein
each of the detection regions includes
a drive transistor configured to drive array electrode, and
a bypass semiconductor layer made of the same material as a semiconductor layer of the drive transistor, and
the bypass semiconductor layer is included in the bypass wire.

11. The force sensor according to claim 2, wherein
each of the detection regions includes
a drive transistor configured to drive the array electrode, and
a bypass semiconductor layer made of the same material as a semiconductor layer of the drive transistor, and
the bypass semiconductor layer is included in the bypass wire.

12. The force sensor according to claim 3, wherein
each of the detection regions includes
a drive transistor configured to drive the array electrode, and
a bypass semiconductor layer made of the same material as a semiconductor layer of the drive transistor, and
the bypass semiconductor layer is included in the bypass wire.

13. A force sensor comprising:
an array substrate having a first surface;
a common electrode provided on the first surface; and
a sensor layer facing the first surface, wherein
the array substrate includes
a plurality of array electrodes provided on the first surface,
a plurality of common electrodes provided on the first surface,
a plurality of first gate lines,
a plurality of second gate lines,
a plurality of drive transistors that have gate electrodes coupled to the respective first gate lines and drive the respective array electrodes, and a plurality of bypass transistors that have gate electrodes coupled to the respective second gate lines, have drain electrodes coupled to the respective array electrodes, and have source electrodes coupled to the common electrode, and the resistance value of each bypass transistor is larger than the resistance value of the sensor layer, when the value of an electric signal input to the array electrode through the sensor layer is minimum.

* * * * *